(12) United States Patent
Lee et al.

(10) Patent No.: US 8,991,497 B2
(45) Date of Patent: Mar. 31, 2015

(54) WELL TREATMENT

(75) Inventors: Jesse C. Lee, Sugar Land, TX (US);
Stephane Boulard, Le Plessis Robinson (FR); Nikhil Shindgikar, Paris (FR);
Slaheddine Kefi, Velizy Villacoublay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 316 days.

(21) Appl. No.: 13/402,866

(22) Filed: Feb. 22, 2012

(65) Prior Publication Data

US 2012/0205102 A1    Aug. 16, 2012

(30) Foreign Application Priority Data

Mar. 11, 2010 (WO) ................. PCT/EP2011/053704

(51) Int. Cl.
*E21B 43/22* (2006.01)
*E21B 33/13* (2006.01)
*C09K 8/035* (2006.01)
*E21B 21/00* (2006.01)
*C04B 40/06* (2006.01)
*C09K 8/487* (2006.01)
*C09K 8/508* (2006.01)
*C09K 8/516* (2006.01)

(52) U.S. Cl.
CPC ................. *C09K 8/035* (2013.01); *E21B 33/13* (2013.01); *E21B 21/003* (2013.01); *C04B 40/0633* (2013.01); *C09K 8/487* (2013.01); *C09K 8/508* (2013.01); *C09K 8/516* (2013.01)
USPC ......... 166/300; 166/292; 166/305.1; 166/376

(58) Field of Classification Search
CPC ...... C09K 8/516; C09K 8/487; E21B 21/003; E21B 33/13
See application file for complete search history.

(56) References Cited

U.S. PATENT DOCUMENTS

| | | | |
|---|---|---|---|
| 3,726,340 A | 4/1973 | Fraser | |
| 3,876,006 A | 4/1975 | Messenger | |
| 4,506,734 A * | 3/1985 | Nolte | 166/308.1 |
| 4,604,444 A | 8/1986 | Donnadieu et al. | |
| 4,626,285 A | 12/1986 | Peiffer et al. | |
| 4,635,726 A | 1/1987 | Walker | |
| 4,664,816 A | 5/1987 | Walker | |
| 4,958,685 A | 9/1990 | Hihara et al. | |

(Continued)

FOREIGN PATENT DOCUMENTS

| | | |
|---|---|---|
| EP | 1727963 | 11/2009 |
| EP | 1152121 | 4/2010 |

(Continued)

OTHER PUBLICATIONS

Biomolecular Surfaces that Release Ligands under Electrochemical Control J. Am. Chem. Soc. 2000, 122, 4235 C. D. Hodneland, Department of Chemistry, University of Chicago.

*Primary Examiner* — Zakiya W Bates
(74) *Attorney, Agent, or Firm* — Michael Dae

(57) ABSTRACT

The following describes a novel and alternative mechanism in regards to releasing reactive chemicals. Namely, utilizing shells containing multiple emulsions that can be blended with the base fluids, and then react with said base fluid upon exposure to a trigger e.g. high shear and/or elongation flow, therefore plugging even large fractures. Such gelling lost circulation material allows to obtain a reliable carrier and fast reaction when triggered.

11 Claims, 2 Drawing Sheets

(56) References Cited

U.S. PATENT DOCUMENTS

| | | |
|---|---|---|
| 4,989,673 A | 2/1991 | Sydansk |
| 5,343,968 A | 9/1994 | Glowka |
| 5,544,705 A | 8/1996 | Jones et al. |
| 6,012,524 A | 1/2000 | Chatterji et al. |
| 6,209,646 B1 | 4/2001 | Reddy et al. |
| 6,364,020 B1 | 4/2002 | Crawshaw et al. |
| 7,740,067 B2 | 6/2010 | Bour et al. |
| 2002/0160920 A1 | 10/2002 | Dawson et al. |
| 2003/0236171 A1 | 12/2003 | Nguyen et al. |
| 2006/0116295 A1 | 6/2006 | Dobson et al. |
| 2007/0287639 A1 | 12/2007 | Reddy et al. |
| 2011/0114318 A1* | 5/2011 | Ezell et al. ............ 166/305.1 |
| 2011/0315384 A1* | 12/2011 | Miquilena et al. ...... 166/305.1 |

FOREIGN PATENT DOCUMENTS

| | | |
|---|---|---|
| GB | 2341876 | 3/2000 |
| GB | 2420361 | 5/2006 |
| GB | 2445086 | 6/2008 |
| WO | 02/40828 | 5/2002 |
| WO | 2007/007118 | 1/2007 |
| WO | 2008077499 | 7/2008 |
| WO | 2009/152989 | 12/2009 |
| WO | 2010/020351 | 2/2010 |

* cited by examiner

WELL TREATMENT

CROSS REFERENCED APPLICATIONS

This application claims the benefit of the disclosure of International patent application number PCT/EP2011/053704 filed on Mar. 11, 2011 incorporated by reference in its entirety.

FIELD

The present disclosure broadly relates to oilfield applications. More particularly it relates to methods for treating lost circulation, downhole, in a subterranean reservoir, such as for instance oil and/or gas reservoir or a water reservoir.

BACKGROUND

The statements in this section merely provide background information related to the present disclosure and may not constitute prior art.

During construction of a subterranean well, drilling and cementing operations are performed that involve circulating fluids in and out of the well. The fluids exert hydrostatic and pumping pressure against the subterranean rock formations, and may induce a condition known as lost circulation. Lost circulation is the total or partial loss of drilling fluids or cement slurries into highly permeable zones, cavernous formations and fractures or voids. Such openings may be naturally occurring or induced by pressure exerted during pumping operations. Lost circulation should not be confused with fluid loss, which is a filtration process wherein the liquid phase of a drilling fluid or cement slurry escapes into the formation, leaving the solid components behind.

Lost circulation can be an expensive and time consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive downhole fluids, and failing to provide adequate zonal isolation. Lost circulation may also be a problem encountered during well-completion and workover operations, potentially causing formation damage, lost reserves and even loss of the well.

Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation (if known) and, as fluid escapes into the formation, congregate and form a barrier that minimizes or stops further fluid flow. Surface-mixed systems are generally fluids composed of a hydraulic cement slurry or a polymer solution that enters voids in the subterranean formation, sets or thickens, and forms a seal that minimizes or stops further fluid flow. Downhole-mixed systems generally consist of two or more fluids that, upon making contact in the wellbore or the lost-circulation zone, form a viscous plug or a precipitate that seals the zone.

WO2010/020351 described a method for treating lost circulation by pumping downhole capsules that once submitted to sufficient stress can break and form a gel that would plug lost circulation zone. GB 2341876 discloses multiphase drilling and completion fluids for carrying an agent. The composition consists of a first, second and third phase. The agent is present in the first phase and the first phase is suspended in the second phase to form a first pumpable emulsion. The composition consists either of an oil phase-in-aqueous phase-in-oil phase composition or an aqueous phase-in-oil phase-in-aqueous phase composition.

The following describes novel and alternative mechanisms in regards to releasing reactive chemicals. Namely, utilizing shells containing multiple emulsions that can be blended with the base fluids, and then react with said base fluid upon exposure to a trigger e.g. high shear and/or elongation flow, therefore plugging even large fractures. Such gelling lost circulation material (LCM) allows obtaining a reliable carrier and fast reaction when triggered.

SUMMARY

Chemical systems designed for oilfield application experience stress throughout the whole placement process. Some systems see relatively low stress, like cement, flowing inside the annulus; and some systems see relatively high stress, like mud, exiting the drill bit. As such, utilizing stress as a mechanism to control the properties of the chemical system exhibits minimum impact in terms of interfering with common operational procedures.

Embodiments disclosed herewith focus on utilizing high stress, encountered by the chemical systems during the placement, as a trigger mechanism to control the release of reactive materials. Once the reactive material is released, then the properties of the whole chemical system can be altered and tailored to meet the performance criteria.

Embodiments pertain to aqueous gelling LCM comprising a carrier fluid containing shells of a polymer having droplets of an accelerator dispersed therein; the LCM further comprising a polymerization initiator.

Methods for treating well bore and especially for treating lost circulation are also part of the present disclosure. Such treatments being achieved by pumping the gelling LCM downhole and by triggering the polymerization when necessary.

BRIEF DESCRIPTION OF THE DRAWINGS

Further embodiments of the present invention can be understood with the appended drawings.

DETAILED DESCRIPTION

Figure 1:
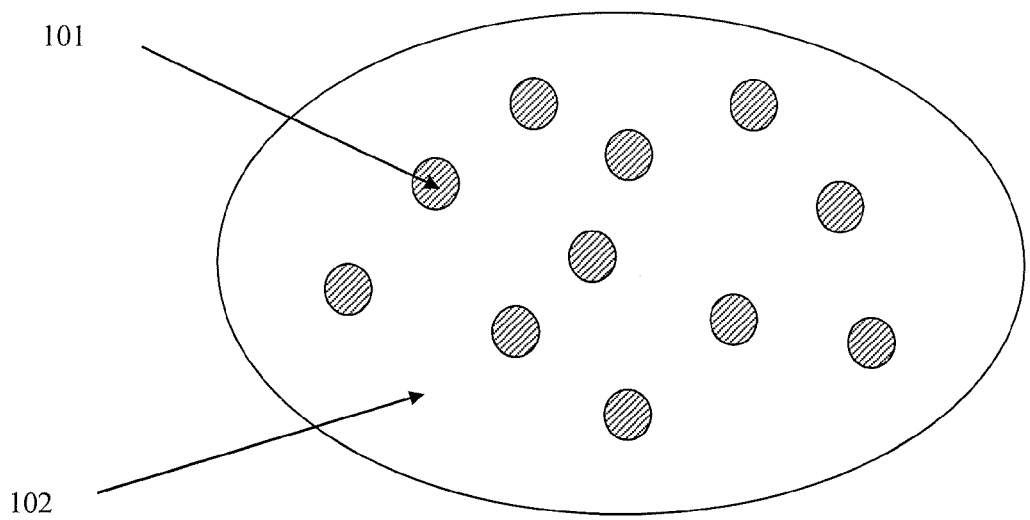
FIG. 1 shows a shell containing droplets of accelerator dispersed therein.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The present disclosure refers to gelling LCM comprising a carrier fluid containing shells of inert polymer having droplets of accelerator contained therein; the LCM further comprising a polymerization initiator. The accelerator being released in the carrier fluid when subjected to a trigger. The trigger may be sufficient stress such as the passage through a restriction, e.g. a perforation or a drill bit. Without being bound by any theory, the inventors believe that the combination of shear and elongational flow experienced in these conditions are producing enough stress to break the shells made from a polymer inert for both the accelerator and the carrier fluid. Basically, the stress might first come from the turbulence experienced in the pumps of surface equipment and within the carrier fluid in itself; after that, the passage of the flow through a restriction creates first some sort of "Venturi effect" with an acceleration of the fluid which will have the effect of deforming the shells and then at the outlet of the restriction another deformation of the shells coming from fluid deceleration. Velocity increases and decreases are typically of the order of 50 to 100 times variation. Strain rates experienced in restriction are typically from 1000 to one million reciprocal second, more specifically 10000 to 200000 reciprocal second. The inventors have noticed that even if the stress experienced during pumping and all along the transportation has an effect on the breakage of the shells, the stress and/or velocity difference which is obtained due to the flow through a restriction is of paramount importance. The stress is closely related to the pressure drop encompassed in each units of the well treatment (pumps, pipes, drill-bit). A higher pressure drop corresponds to a higher stress applied. Typically, the highest stress is observed when the fluid passes through the nozzles in a drill bit or a port of completion string downhole. By stress sufficient to break the shells, it is to be understood in the context of the present disclosure that said sufficient stress is produced by the passage through the nozzles of the drill bit or similar restriction to allow the accelerator to be released from the shells. Preferably, the pressure drop observed when passing through the nozzles is from about 150 to 5000 psi (10 to 345 bar), more preferably from 300 to 5000 psi (20 to 345 bar), most preferably from 300 to 1000 psi (20 to 69 bar). As shown earlier, the stress may sometimes also be referred to as a velocity difference.

As apparent from FIG. 1, the shell (101) is made from a polymer that is inert to the accelerator, the carrier fluid and the polymerization initiator. The shells are preferably made from a polyurea polymer and its derivatives; more preferably the shells are made from polyurethane. The shells preferably have a diameter (or main dimension) of from 1 to 5000 microns, more preferably from 10 to 2000 microns even more preferably from 30 to 1000 microns.

Also, as shown on FIG. 1, the shell (101) contains droplets of accelerator (102) dispersed therein. Basically these are droplets of water solution containing the accelerator.

The polymerization accelerator usable in gelling LCMs as disclosed are advantageously compounds which accelerates the polymerization of water soluble or water dispersable monomers comprising acrylated or methacrylated poly-oxyethylene and/or poly-oxypropylene monomers (also sometime referred to as "macromonomers" due to the presence of poly-oxyethylene and/or poly-oxypropylene chain in the monomer).

Said accelerator is generally an amino compound like an alkylamine, polyalkylen amine or poly alkylen imine preferably comprising tertiary amino groups and whose alkyl or alkylen part comprises 2-4 carbon atoms. Primary or secondary amines or amine hydrochlorides can also be employed, although the polymerization rate obtained with these accelerators is often lower than with tertiary amines. The amine polymerization accelerator may include other chemical functional groups in its formula, such as, for example nitrile or hydroxyl or ester functional groups. The ester functional groups may, in particular, originate from the esterification with acrylic acid or methacrylic acid of one or more hydroxyl functional groups present in the formula of the amine. Among the preferred tertiary amines there may be mentioned diethylaminopropionitrile, triethanolamine, dimethylaminoacetonitrile, diethylenetriamine, N,N-dimethylaniline, dimethylaminoethyl methacrylate, dimethylaminoethyl acrylate, triethanolamine methacrylate and triethanolamine acrylate.

A preferred accelerator is a polyethyleneimine (PEI) such as for example the one commercially available from BASF under the name of Lupasol®.

The accelerator is usually used at levels from 0.01% to 10% by weight over the weight of the carrier fluid, and preferably from 0.1% to 1.0%. Other accelerators, catalysts or co-accelerators can be used like metal ions such as copper or iron as catalysts of the activation.

Figure 2:
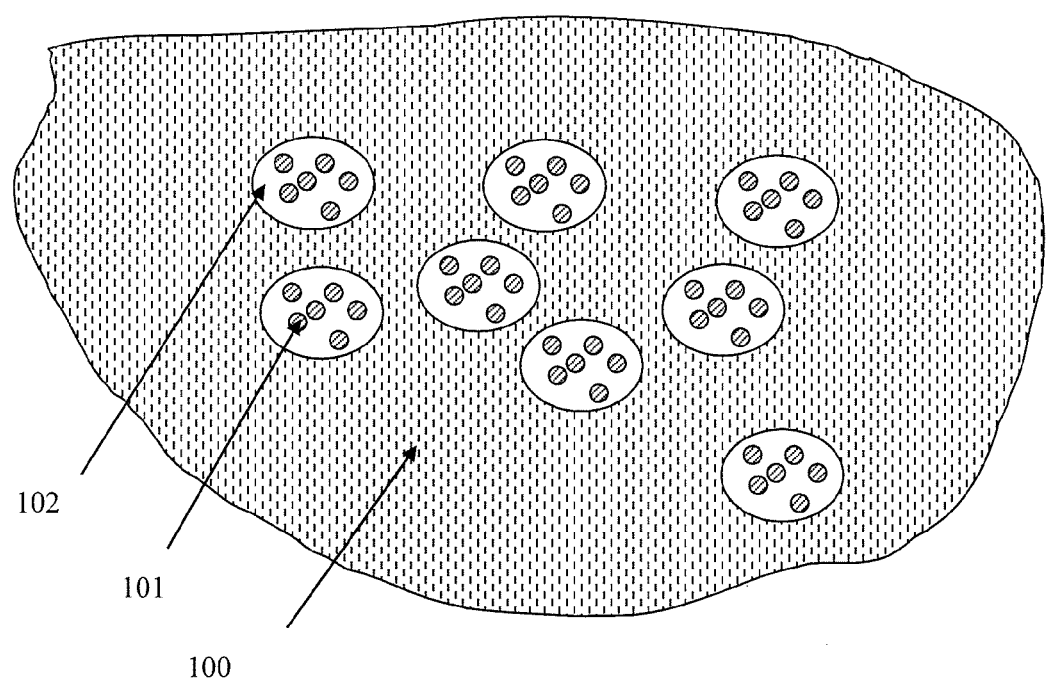
FIG. 2 shows a gelling LCM according to the present disclosure.

FIG. 2 shows the shells in the carrier fluid (100). Said carrier fluid is preferably a water soluble or water dispersible monomers comprising polymerizable compounds such as an acrylated or methacrylated poly-oxyethylene and/or poly-oxypropylene monomers which can present the general formula:

$$CH_2\!=\!CR^1\!-\!CO\!-\!(O\!-\!CH_2\!-\!CHR^2)_n\!-\!OR^3 \qquad (I)$$

Wherein:
$R^1$ is a hydrogen atom or a methyl radical,
$R^2$ is a hydrogen atom or a methyl radical, and
$R^3$ is a hydrogen atom, a methyl radical, or a $CH_2\!=\!CR^1\!-\!CO\!-$ group.
n is a whole or fractional number from 3 to 25.

In said carrier fluid, Poly-ethylene oxide chain are preferably about 1000 g/mol as short chains are not hydrophilic enough to balance the hydrophobicity of the methacrylate end groups (especially at high temperature and high salinity) on the other hand, longer chains lead to less reactive molecules. As a consequence, preferred monomers are of the formula:

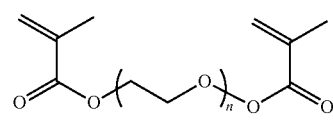

Wherein n is a number between 15 and 25, limits included, and/or

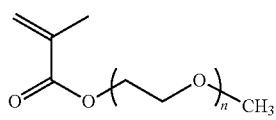

Wherein n is a number between 10 and 20, limits included, and/or

In addition, these monomers are preferably non-volatile, classified as polymers and show no toxicity.

According to a specific embodiment, the water-soluble or water-dispersible monomers used in the composition of the invention is a mixture comprising at least two distinct kinds of monomers of formula (I), namely a first part of monomers wherein $R^3$ is a methyl radical (herein referred to as monofunctional monomers I-1); and a second part of monomers wherein $R^3$ is a $CH_2=CR^1$—CO— group (herein referred to as bisfunctional monomers I-2). According to an economical process, this mixture of monomers may advantageously be prepared by reacting a mixture of two compounds (A1) and (A2) having the following formula:

$$HO-(O-CH_2-CHR^2)_n-OMe \quad (A1)$$

$$HO-(O-CH_2-CHR^2)_n-OH \quad (A2)$$

wherein $R^2$ is as defined above,
with a (meth)acrylic acid, chloride or anhydride (preferably an anhydride), typically a (meth)acrylic anhydride of formula $(CH_2=CR^1-C)_2O$ wherein $R^1$ is as defined above.

Advantageously, in this preparation process, compounds (A1) and (A2) are used so as to obtain a mean number of —OH group of between 1.1 and 1.5 ((A1) bears one —OH and (A2) bears two —OH). In this connection, it is typically preferred for the molar ratio (A2):(A1) to be between 10:90 and 50:50.

Depending on the end-use temperature conditions, either water-soluble persalts like sodium persulfate, ammonium persulfate or potassium persulfate for low temperature (10 to about 40° C.) or water-soluble or water-dispersible peroxides like tertiobutyl hydroperoxide (TBHP), tertioamyl hydroperoxide and cumene hydroperoxide for temperature above 40° C. are used as polymerization initiators and mixed with the carrier fluid without any reaction within at least 2 to 3 hours at the target temperature. The polymerization reaction of the monomers can easily be triggered by the addition to said monomers of an amine accelerator. A stiff gels sets then within a few minutes to a few hours depending on targeted application and on how far from the injection point versus pumping rate the gel plug is to be placed, with the combined action of the initiator and accelerator whose concentrations are adapted to the conditions (essentially the temperature) of the monomers in the gelling remote location.

The polymerization initiator may be either contained with the droplets of accelerator and/or present in the carrier fluid.

Accordingly, in embodiments where the polymerization initiator is in the carrier fluid, the inventive gelling LCMs comprise:
i) a carrier fluid containing water-soluble or water-dispersible monomers comprising acrylated and/or methacrylated poly-oxyethylene and or poly-oxypropylene monomers, and
ii) polymerization initiators dispersed in i), wherein the carrier fluid is stable in the storage or injection conditions but starts to polymerize upon addition and/or contact with the accelerator in the pressure and temperature conditions at the remote location to be treated;
iii) shells (101) containing an accelerator, said shells being dispersed in the carrier fluid, and being made from a polymer that is inert to the accelerator, the carrier fluid and the polymerization initiator.

As apparent from the disclosure, the initiator is preferably in the carrier fluid but it may also be present with the accelerator in the shells of inert polymer.

The LCMs can have various applications such as drilling, completion, stimulation, production enhancement or remedial operations in subterranean zones penetrated by a borehole by initiating polymerization with a crosslinker. The preferred application being lost circulation treatment by triggering the reaction close to fractures in the formation, thereby creating a strong gel that plug said fractures and or isolate it from production zones.

In Embodiments, the gelling LCM is pumped as a pill. Typically, operators on a rig will notice a decrease in the flow of fluid returning to surface or even sometimes no return at all; if the decision is made to use the present lost circulation solution, a volume of the present gelling LCM will be prepared and pumped in order to plug the zone where part or all of the fluid is lost. A typical volume of treatment varies from 1 to 30 $m^3$, preferably from 3 to 20 $m^3$, more preferably from 5 to 16 $m^3$.

The present lost-circulation solution is particularly useful in situation where conventional treatment are not successful and thus large fractures are preferably targeted, large fractures, in the industry are typically larger than 3 mm, even larger than 5 mm; the present gelling LCM may even be envisaged for plugging fractures larger than 10 mm.

The carrier fluid may further include other additives, such as pH control agent, delaying agent, fillers, fluid-loss agents, lubricating agents, biocides, weighting agent and other relevant additives for the specific application the gelling LCM is used for. In particular, weighting agent may be used to tune the density of the pill. Said density is preferably comprised between 800 $kg/m^3$ to 2400 $kg/m^3$. The viscosity of the gelling LCM before polymerization is activated is preferably equal to or below 300 cP.

In all embodiments, the selection of polymerization initiator will vary depending on the particular polymerizable compounds that are used in the carrier fluid, and the compatibility of various polymerizable compounds and initiators will be understood by those skilled in the art. Illustrative examples of polymerization initiators employable herein can include oxidizing agents, persulfates, peroxides, azo compounds such as 2,2'-azobis(2-amidinopropane)dihydro-chloride and oxidation-reduction systems.

A possible process to produce the lost circulation materials containing the shells and/or gelling LCMs as disclosed herein may be the following:
a) providing a reverse emulsion containing in an oil phase a water solution or dispersion (referred as W1) containing a polymerization activator, the oil phase being (or at least including) a heat-curable mixture of an isocyanate and a polyalkyldiene hydroxylated or polyol,
b) pouring the reverse emulsion of step a) in a water phase (referred as W2) to make a multiple emulsion water/oil/water, containing drops of activators (as the internal water phase) and, then,
c) heating the multiple emulsion obtained in step b) at a temperature of between 50 and 95° C., in order to cure the polyisocyanate in polyurethane and obtain drops of activator (W1) enclosed in shells of polyurethane dispersed in water (W2).

As mentioned earlier, the present lost-circulation material may contain a gelling LCM based on the encapsulated accelerator as obtained according to steps a) to c) and further comprising water-soluble or water-dispersible acrylated or methacrylated polyoxyethylene and/or polyoxypropylene monomers together with polymerization initiators such as peroxides or persulfates. Such LCM comprises:
i) water-soluble or water-dispersible monomers comprising acrylated or methacrylated polyoxyethylene and/or polyoxypropylene monomers;
ii) a polymerization initiator dispersed in said monomers i); and
iii) an encapsulated polymerization accelerator as obtained with the process disclosed herein.

As mentioned previously, the polymerization initiators ii) may be encapsulated with the accelerator iii). In that case, the initiators and the accelerator are generally both in the internal water phase inside the capsules obtained. Such a co-encapsulation may be obtained e.g. by providing in step a) of the process of the invention an emulsion which comprises both the initiators and the accelerator in the water solution or dispersion (W1).

The gelling operation may be carried out in the end-use locations through a polymerization reaction initiated by release, of the accelerator, in the carrier fluid containing water-soluble or water-dispersable monomers.

In order to achieve that release at the appropriate timing for the application, the accelerator may be encapsulated before use, by the multiple emulsion process as disclosed herein.

Optionally, in step a), a solvent or plasticizer can be added to the oil phase said solvent or plasticizer may be for example di-isobutyl ester of succinate, glutarate or adipate. This addition allows tuning the mechanical properties of the polyurethane shells.

Optionally, in step a), a non-ionic surfactant may be added to the water phase W1, wherein said activator is dispersed or in solution. The non-ionic surfactant can be for example a di-$C_1$-$C_8$ alkyl ester of a saturated or unsaturated fatty acid having 12 to 22 carbon atoms.

Preferably, the water phase (W2) of step b) contains a mineral salt like NaCl and xanthan gum. The mineral salt is used in order to balance the osmotic pressure to prevent the reverse emulsion of step a) from bursting. Xanthan gum is used as protective colloid and rheological agent. It will be apparent to a person skilled in the art that even if xanthan gum is mentioned herein, other polymers such as gelatin, pectin, derivatives of cellulose, arabic gum, guar gum, locust bean gum, tara gum, cassia gum, agar, alginates, carraghenanes, chitosan, scleroglucan, diutan, polyvinyl alcohol, polyvinyl pyrrolidone or modified starches such as n-octenyl succinated starch, porous starch, and mixtures thereof may be used. Similarly even if NaCl is mentioned, other equivalent salts might be used.

Advantageous isocyanates to be used in step a) are alpha, omega-aliphatic diisocyanates. These aliphatic diisocyanates, to be condensed with polyamines/polyols, may be either isocyanate molecules, referred to as monomers, that is to say non poly-condensed, or heavier molecules resulting from one or more oligocondensation(s), or mixtures of the oligocondensates, optionally with monomers.

As will be clarified subsequently, the commonest oligocondensates are biuret, the dimer and the trimer (in the field under consideration, the term "trimer" is used to describe the mixtures resulting from the formation of isocyanuric rings from three isocyanate functional groups; in fact, there are, in addition to the trimer, heavier products are produced during the trimerization reaction). Mention may in particular be made, to monomer, of polymethylene diisocyanates, for example, TMDI (TetraMethylene DiIsocyanate) and HDI (Hexamethylene DiIsocyanate of the formula: OCN—$(CH_2)_6$—NCO and its isomers (methylpentamethylene diisocyanate)].

It is preferred, in the structure of the, or of one of the isocyanate monomer(s), for the part of the backbone connecting two isocyanate functional groups to comprise at least one polymethylene sequence. Mention may also be made of the compounds resulting from the condensation with diols and triols (carbamates and allophanates) under substoichiometric conditions. Thus, in the isocyanate compositions, it is possible to find:

isocyanurate functional groups, which can be obtained by catalyzed cyclocondensation of isocyanate functional groups with themselves, urea functional groups, which can be obtained by reaction of isocyanate functional groups with water or primary or secondary amines, biuret functional groups, which can be obtained by condensation of isocyanate functional groups with themselves in the presence of water and of a catalyst or by reaction of isocyanate functional groups with primary or secondary amines, urethane functional groups, which can be obtained by reaction of isocyanate functional groups with hydroxyl functional groups.

The shells of polyurethane obtained in step c) typically have an average diameter of between 10 and 1500 μm, preferably between 300 and 800 μm.

EXAMPLES

The following examples serve to further illustrate the invention. The materials used in the examples are commonly available and used in the oilfield industry.

Example 1

A gelling LCM was prepared as follows:

Step a): an aqueous solution of Polyethyleneimine (PEI, Lupasol P from BASF) was dispersed in mixture of OH functionalized butadiene (Poly BD R45HT-LO from Sartomer), isophorone di-isocyanate trimer supplied diluted with 30% wt butyl acetate (Tolonate IDT 70B from Perstorp) and diluted with Rhodiasolv DIB (succinate, glutarate, adipate diisobutyl ester from Rhodia). In order to ease the emulsification process, the emulsion of PEI in OH functional butadiene diluted with DIB was first made, and, then, the isocyanate was added to the already formed emulsion.

The particle size of the emulsion was set by acting on mixing speed.

The different quantities of ingredients were gathered in the following table 1:

TABLE 1

| Ingredients | Weight (g) |
| --- | --- |
| OH functionalized butadiene Poly BD R45HT-LO from Sartomer | 186.9 |
| DIB | 186.9 |
| PEI | 532.7 |
| Tolonate IDT 70B from perstorp | 93.5 |
| Total | 1000.0 |

The mixing time after the addition of isocyanate was set to 5 min. As a consequence, the reverse emulsion was very quickly transferred to the aqueous phase to form the multiple emulsion of step b).

Step b) The reverse emulsion from step a) was then dispersed under vigorous stirring conditions to achieve the multiple emulsion. A very good and homogeneous mixing efficiency is needed at that stage to maintain a particle size distribution as narrow as possible.

To stabilize the suspension and avoid bursting of the shells while the polyurethane was not fully crosslinked, the dispersion was made in a salted xanthan solution. The salt (here NaCl at 20% wt) ensured the osmotic pressure balance between the inner PEI and outer xanthan solution phases. A mismatch of osmotic pressure may potentially cause a burst of the inverse emulsion. Xanthan was used here as a "protective colloid" and rheological agent. Indeed, it showed very good suspensive properties as well as stabilization of the emulsion in salt water and even at elevated curing temperature (up to 80° C. here).

As long as a homogeneous mixing was ensured during step b), the particle size distribution was directly linked to the mixing speed. Here a rotation speed of 280 rpm gave a particle size of approximately 400 µm.

Typical operating conditions were reported here below:
transfer of emulsion of step a) to the reactor (containing the 0.45% wt xanthan in 20% wt NaCl water solution) under shear 280 rpm heated to 66° C. (envelope temperature)
after addition maintain agitation at 280 rpm for 15 min
reduce speed to minimal 37 rpm and maintain for 2 h for curing of the elastomer For 1000 g emulsion from step 1 quantities necessary for the second step were reported in table 2 below:

TABLE 2

| ingredients | Weight (g) |
|---|---|
| Deionized water | 700.7 |
| xanthan (Rhodopol 23P) | 4.0 |
| NaCl Normapur | 177.0 |
| total | 881.7 |

Example 2

In a nitrogen inerted round bottom flask, a mixture of methoxy polyethylene glycol (MW=750 g/mol) and polyethylene glycol (MW=1000 g/mol) respectively 67% and 33% by weight was poured at 50° C. Methoxy polyethylene glycol and polyethylene glycol were bearing respectively 1 and 2 OH function per molecule. The necessary quantity of methacrylic anhydride (AM2O) to get a molar ratio AM2O/OH of 1 was added to the reaction medium. Prior used, AM2O was stabilized with 1000 ppm phenothiazine and 1000 ppm topanol.

The quantities and the nature of the used products were reported in the table 3 below:

TABLE 3

| | supplier | purity | M (g/mol) | m (g) |
|---|---|---|---|---|
| methacrylic anhydride AM2O | Aldrich | 94% | 154.16 | 25.5 |
| PEG 1000 | Fluka | 100% | 1000 | 33 |
| methoxy PEG 750 | Aldrich | 100% | 750 | 67 |
| phenothiazine | Acros | 99% | 199.3 | 0.024 |
| topanol A | Brenntag | 78.5-100% | 178 | 0.024 |

The reaction medium was heated up to 80° C. for 10 h under stirring of a magnetic bar (with an expected yield of esterification of 80%).

Flask was then placed under vacuum (30 mbar) and heated to 90° C. Under these pressure and temperature conditions, produced methacrylic acid was removed by vapor stripping. Stripping was considered as complete when residual methacrylic acid content was below 2%. The obtained product was diluted with water to 70%. This material will hereinafter be referred to as "PEO-methacrylate monomers".

Example 3

The shells from example 1 were formulated with a PEO-methacrylate monomers from example 2. The PEO-methacrylate monomers consisted here in a blend of PEO (500 g/mol) mono-methacrylate and PEO (1000 g/mol) di-methacrylate with a weight ratio mono-methacrylate/di-methacrylate=2/1

Formulations were thickened using hydroxyl-ethyl cellulose (HEC) (Cellosize 10-HV from Dow Chemical). The solid polymer was hydrated for at least 1 h under stirring in de-ionized water at 0.5% wt prior use.

Other components were gently mixed together in quantities as reported in table below:

TABLE 4

| | formulation | |
|---|---|---|
| | formulation #2-1 m (g) | formulation #2-2 m (g) |
| PEO-methacrylate monomers | 3.75 | 3.75 |
| HEC at 0.5% | 21.25 | 21.25 |
| Sodium persulfate | 0.125 | 0.25 |
| shells from example 1 | 0.25 | 0.25 |

Half of each formulation was sheared for 10 s at 16000 rpm using a rotor-stator blender (Ultra-Turrax T25 basic from IKA). Solution of both sheared and un-sheared formulations are then let to set at 21° C. and setting times are reported in table below.

TABLE 5

| | formulation #2-1 | formulation #2-2 |
|---|---|---|
| sheared ultra turrax | gelification after 105 min | gelification after 65 min |
| un-sheared | gelification after 25 h | gelification after 21 h |

The results gathered in the above table, shows that shear from rotor stator blender can release the polymerization activator and induce gelation of the formulation.

Example 4

In order to ensure proper temperature stability for the POE-methacrylate monomers at high temperature, a more thermally stable oxidizer was used and an extra inhibitor was added to the system. The inhibitor used here was the 4-Hydroxy-2,2,6,6-tetramethylpiperidine 1-oxyl (or hydroxyl-TEMPO).

The capsules from example 1 were formulated with PEO-methacrylate monomers.

Formulations were thickened using hydroxyl-ethyl cellulose (HEC) (Cellosize 10-HV from Dow Chemical). The solid polymer was hydrated for at least 1 h under stirring in de-ionized water at 0.5% wt prior use.

Other components were gently mixed together in quantities as reported in table below:

TABLE 6

|  | formulation<br>formulation #3-1<br>m (g) |
|---|---|
| PEO-methacrylate monomers | 3.75 |
| HEC at 0.5% | 21.25 |
| tertiobutyl hydroperoxide, 70% in water | 0.10 |
| capsules from example 1 | 0.25 |
| Hydroxy-TEMPO, 1% in water | 0.19 |

Then half of the formulation was sheared for 10 s at 16000 rpm using a rotor-stator blender (Ultra-Turrax T25 basic from IKA). Solution of both sheared and un-sheared formulations were placed in an oven heated at 80° C. and setting times were reported in table below.

TABLE 7

|  | formulation #3 |
|---|---|
| sheared ultra turrax | 45 min |
| un-sheared | 210 min |

Considering that in the oven, samples took about 60 min to reach 80° C. and were at 65° C. after 45 min, the above table shows that a sheared sample was activated very quickly once at elevated temperature while an un-sheared sample remained stable for a couple of hours at 80° C. without any reaction.

Example 5

Figure 3:
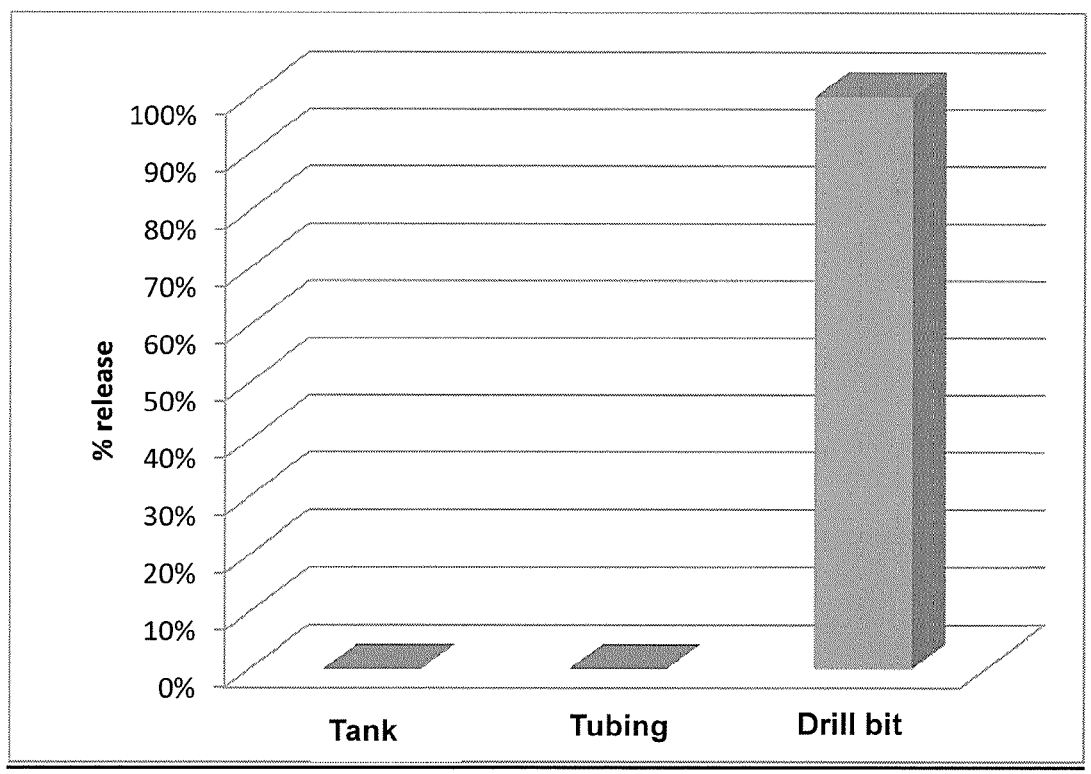
FIG. 3 shows a measurement of release of the accelerator when subjected to various stress.

A sample of the gelling LCM as in Example 2 was collected in a tank. Release of accelerator was measured and indicated 0% of release. The fluid was pumped at 218 L/min through a centrifugal pump and a Triplex reciprocating pump: after that, another sample (tubing) was collected and no detectable release was observed. Then the fluid was pumped through a drill bit nozzle creating a pressure drop of 70 bar. FIG. 3 shows the release measurement of the first two samples as compared to the release of the LCM under pressure drop of 70 bar. The difference was significant with 100% of accelerator released for the sample passed through drill bit. This indicates that, in these conditions, all the release was triggered through the drill bit nozzle.

Release of PEI was measured by UV spectroscopy. The droplets of accelerator (PEI) do not possess chromophores. Accordingly upon addition of copper (II) ions, PEI forms a dark blue cuprammonium complex that can be detected by UV-visible spectroscopy. The solution of copper ions was optimized by adding 10 volume % of HCl 0.1 mol/L.

The invention claimed is:

1. A method for treating lost circulation comprising:
   (i) pumping, in a zone of a wellbore or near-wellbore, a gelling lost circulation material (LCM) comprising a carrier fluid containing polymerizable compounds; the LCM further comprising a polymerization initiator and shells having drops of accelerator contained therein;
   (ii) submitting the gelling LCM to a stress sufficient to rupture the integrity of the shells; and
   (iii) allowing contact to occur between the polymerizable compounds, the polymerization initiator and the accelerator, thereby forming a gel.

2. The method of claim 1, wherein the stress is obtained by pumping the gelling LCM through at least one restriction.

3. The method of claim 2, wherein the restriction is a drill bit nozzle.

4. The method of claim 3, wherein the gelling LCM encounters a pressure drop between 10 and 345 bar when being pumped through said nozzle.

5. The method of claim 1, wherein the stress is a velocity variation of at least 50.

6. The method of claim 1, wherein the stress is a pressure difference of at least 10 bar.

7. The method of claim 1, wherein the gelling LCM is pumped as a pill.

8. The method of claim 1, wherein the viscosity of the gelling LCM is equal to or less than 300 cP.

9. The method of claim 1, wherein the density of the gelling LCM is between 800 kg/m$^3$ and 2400 kg/m$^3$.

10. The method of any of the preceding claims, wherein the gelling LCM is pumped directly in a fracture of the formation to be treated.

11. The method of claim 10, wherein the pill is placed through coiled tubing.

* * * * *